(12) United States Patent
Pelaez et al.

(10) Patent No.: US 7,136,462 B2
(45) Date of Patent: Nov. 14, 2006

(54) NETWORK SPEECH-TO-TEXT CONVERSION AND STORE

(75) Inventors: Mariana Benitez Pelaez, Naperville, IL (US); Charu Verma, Darien, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 356 days.

(21) Appl. No.: 10/619,866

(22) Filed: Jul. 15, 2003

(65) Prior Publication Data
US 2005/0013419 A1 Jan. 20, 2005

(51) Int. Cl.
*H04M 11/00* (2006.01)
*H04M 1/64* (2006.01)

(52) U.S. Cl. .............................. 379/88.14; 379/88.13; 379/88.17

(58) Field of Classification Search ............. 379/88.12, 379/88.13, 88.14, 88.17, 88.18
See application file for complete search history.

(56) References Cited

U.S. PATENT DOCUMENTS

| | | | | |
|---|---|---|---|---|
| 5,475,738 A | * | 12/1995 | Penzias | 379/88.14 |
| 5,557,659 A | * | 9/1996 | Hyde-Thomson | 379/88.13 |
| 5,737,395 A | * | 4/1998 | Irribarren | 379/88.13 |
| 5,870,454 A | * | 2/1999 | Dahlen | 379/88.14 |
| 6,233,318 B1 | * | 5/2001 | Picard et al. | 379/88.17 |
| 6,404,860 B1 | * | 6/2002 | Casellini | 379/88.17 |
| 6,628,763 B1 | * | 9/2003 | Mani | 379/93.35 |
| 6,633,630 B1 | * | 10/2003 | Owens et al. | 379/93.24 |
| 6,950,501 B1 | * | 9/2005 | Chaturvedi et al. | 379/52 |
| 2003/0039340 A1 | * | 2/2003 | Deshpande et al. | 379/88.16 |
| 2003/0112930 A1 | * | 6/2003 | Bosik et al. | 379/88.17 |
| 2004/0252679 A1 | * | 12/2004 | Williams et al. | 370/356 |

* cited by examiner

*Primary Examiner*—Benny Q. Tieu

(57) ABSTRACT

A telecommunications system (100) includes network access devices (104) that couple user devices (102) to a telecommunications network (106). The user devices (102) include at least voice and preferably text display and text generation capability. A voicemail server (114) is coupled to the telecommunications network. The voicemail server (114) is also coupled to an application server (116). Selectively, speech traveling through the telecommunications network (100) from user devices (102) is converted into text, stored, and forwarded to a user device as a text message. The text message is for example a facsimile transmission, an e-mail, or a SMS message. The selectivity is based on a stored attribute, current status of the user device, attributes of the sending device and the like. Text can even be converted into speech as an option. Or, stored speech associated with a text message can be retrieved based on the text message.

5 Claims, 4 Drawing Sheets

NETWORK SPEECH-TO-TEXT CONVERSION AND STORE

FIELD OF THE INVENTION

The invention generally relates to telecommunications networks, and in particular, to the provision of speech-to-text conversion and storage in a multimedia telecommunications network.

BACKGROUND OF THE INVENTION

Multimedia communications systems, with capabilities for voice, data, audio and video, are becoming the standard. Such systems incorporate traditional voice communications, such as wireless and wire-line voice communications, traditional data communications and the Internet, and certain aspects of broadcast communication, most notably, video. At the backbone of such systems are circuit-switched network elements and packet-based network elements. Intermixing media in multimedia communications systems has not been fully exploited.

Text-to-speech conversion is one form of mixing media that exists today. There are various software programs that exist from MICROSOFT and others. Speech-to-text conversion also exists. And these algorithms and implementations are maturing over the years. Unfortunately, these technologies are employed in the computer rather than the telecommunications arts, which limits the applications of these technologies.

Therefore, a need exist for improved and enhanced multimedia communications systems that exploit speech-to-text and text-to-speech capabilities in telecommunications systems.

SUMMARY OF THE INVENTION

A telecommunications system includes a network access device that couples a plurality of user devices to a telecommunications network. The user devices include at least voice and preferably text display and text generation capability. A voicemail system is coupled to the telecommunications network. The voicemail system is also coupled to an application server. Selectively, speech traveling through the telecommunications network from user devices is converted in to text, stored, and forwarded to a user device as a text message. The text message is sent to a user or otherwise made available for a user, for example, by a facsimile transmission, an e-mail, an SMS message or posting on a Web page. The selectivity is based on a stored attribute, current status of the user device, attributes of the sending device and the like. Text can even be converted into speech as an option. Or, stored speech associated with a text message can be stored and retrieved based on the text message.

DESCRIPTION OF THE PREFERRED EMBODIMENTS

Figure 1:
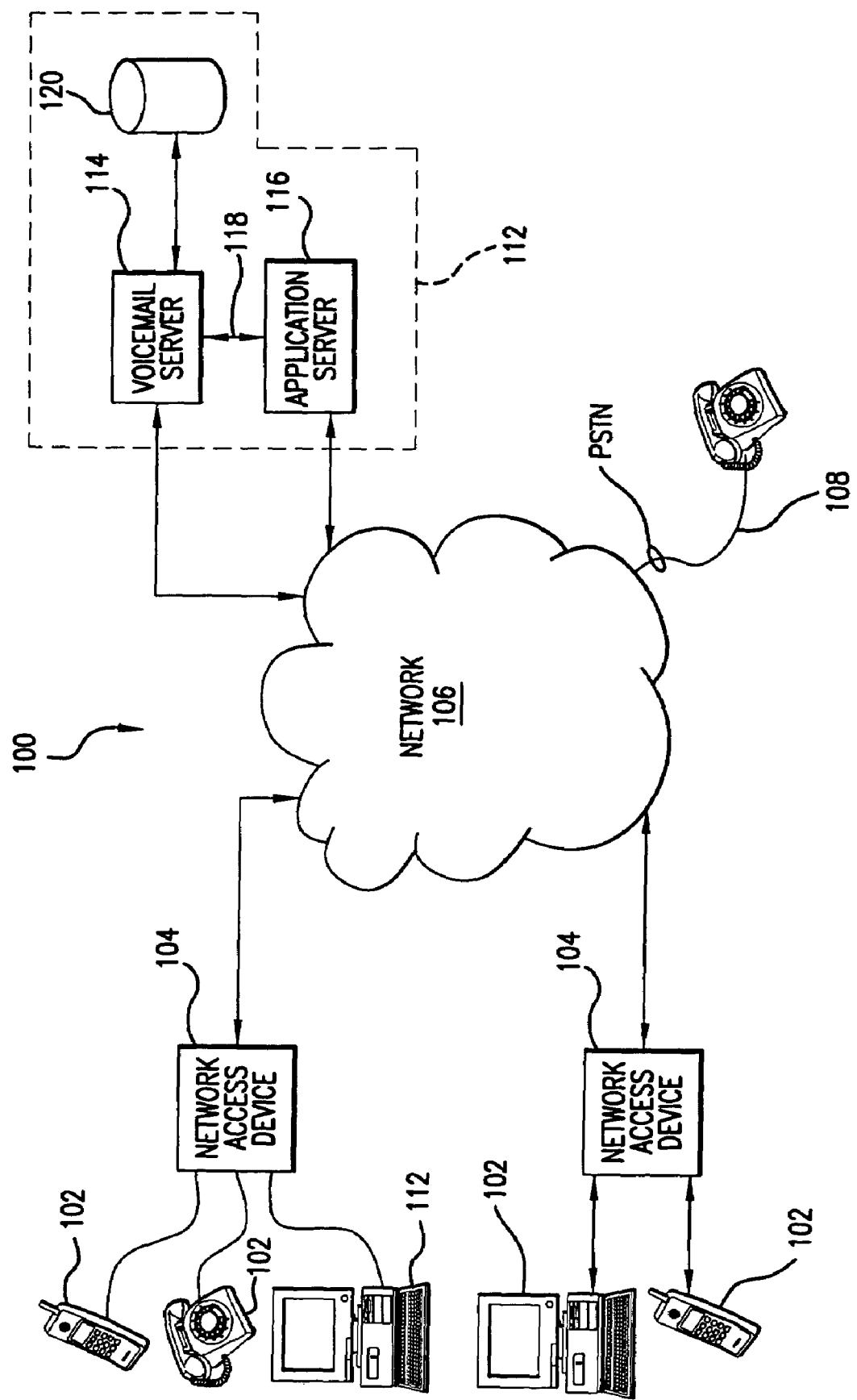
FIG. 1 is a block diagram of a multimedia telecommunications network in accordance with the present invention.

FIG. 1 is a block diagram of a preferred embodiment of a multimedia communications system 100 in accordance with the present invention. Users interact with multimedia communications system 100 and other users via user devices 102. User devices 102 are coupled to a network 106 by a network access device 104. A voicemail system 112 is coupled to network 106. Voicemail system 112 preferably includes a voicemail server 114 and an applications server 116. Preferably application server 116 is coupled to voicemail sever 114 and the network 106. Network 106 preferably has connections to the pubic-switched telephone network 108, which makes traditional connections to telephones.

Multimedia communications system 100 is, for example, a third generation wireless system, as defined and proposed by the $3^{rd}$ Generation Partnership Program, also known as 3GPP (see 3gpp.org).

User devices 102 are typically mobile devices that include a user interface and an interface for coupling to communications system 100. The user interface of user devices 102 is sometimes referred to as terminal equipment and generally includes an audio interface, such as a microphone and speakers, a visual interface, such as a display, and a user input interface, such as a keyboard or touch pad. The interface for coupling to communications system 100 is typically referred to as a mobile terminal and generally includes an over-the-air interface for transmitting and receiving data. Alternatively, the interface for coupling the user device 102 to the communications system is a wired connection, such as a local area network connection, or a traditional telephone interface. Exemplary user devices 102 include wireless telephones, computers, personal digital assistants, and the like.

Network access devices 104 provide an interface for coupling user devices 102 to network 106. The type of network access device varies according to the type of user devices 102. For example, where the user devices 102 are wireless devices, the appropriate network access device includes an over-the-air interface for communicating with user devices 102. Such network access devices include radio network controllers, base stations and the like. Where user devices 102 are computers, the appropriate network access devices include switches, media gateways, media resource functions, or hubs for connecting to a packet network. Where user devices 102 are telephones, the appropriate network access device 104 includes circuit switching elements that couple telephone-type devices to a packet or circuit-switched network.

Network 106 is any network. Preferably, network 106 includes packet-based and circuit-switched elements with appropriate gateways for connecting diverse elements together for communication. Alternatively, network 106 is homogeneous, that is, includes only circuit-switched or packet-based network elements.

Voicemail system 112 is preferably a traditional voicemail system that is modified to include speech-to-text processing in accordance with the present invention. Most preferably, voicemail system 112 includes a voicemail server that is coupled to an application processor. In this arrangement, voicemail server 114 processes and stores audio messages for future retrieval. And, application server 116 processes audio to convert speech into text and stores the text. Voicemail system 112 is preferably a processor-based apparatus, such as a computer or the like, that is programmed to implement a voicemail system. Application server 116 is preferably a processor-based apparatus, such as a computer or the like, programmed to implement a speech-to-text algorithm and a text-to-speech algorithm. As an alternative to two separate servers, a single server may function as voicemail system 112. Alternatively the speech-to-text processing may be integrated as part of the voicemail server 114. Alternatively the speech-to-text may be part of a media gateway or media resource function, as those terms are used in 3GPP. A preferred speech-to-text conversion algorithm uses user profiles and adapts to a speaker's language, language usage and slang. A preferred text-to-speech algorithm has analogous features. Storage, such as disk 120, is provided in or coupled to voicemail system 112 to store speech or text and other data.

Multimedia communications system 100 provides users with a variety of options for communication. Users are able to transmit and receive multimedia communications, including audio, voice, video, and all types of data. Multimedia communications system 100 provides access to data networks, such as the Internet, and public telephone networks, including wireless networks.

Figure 2:
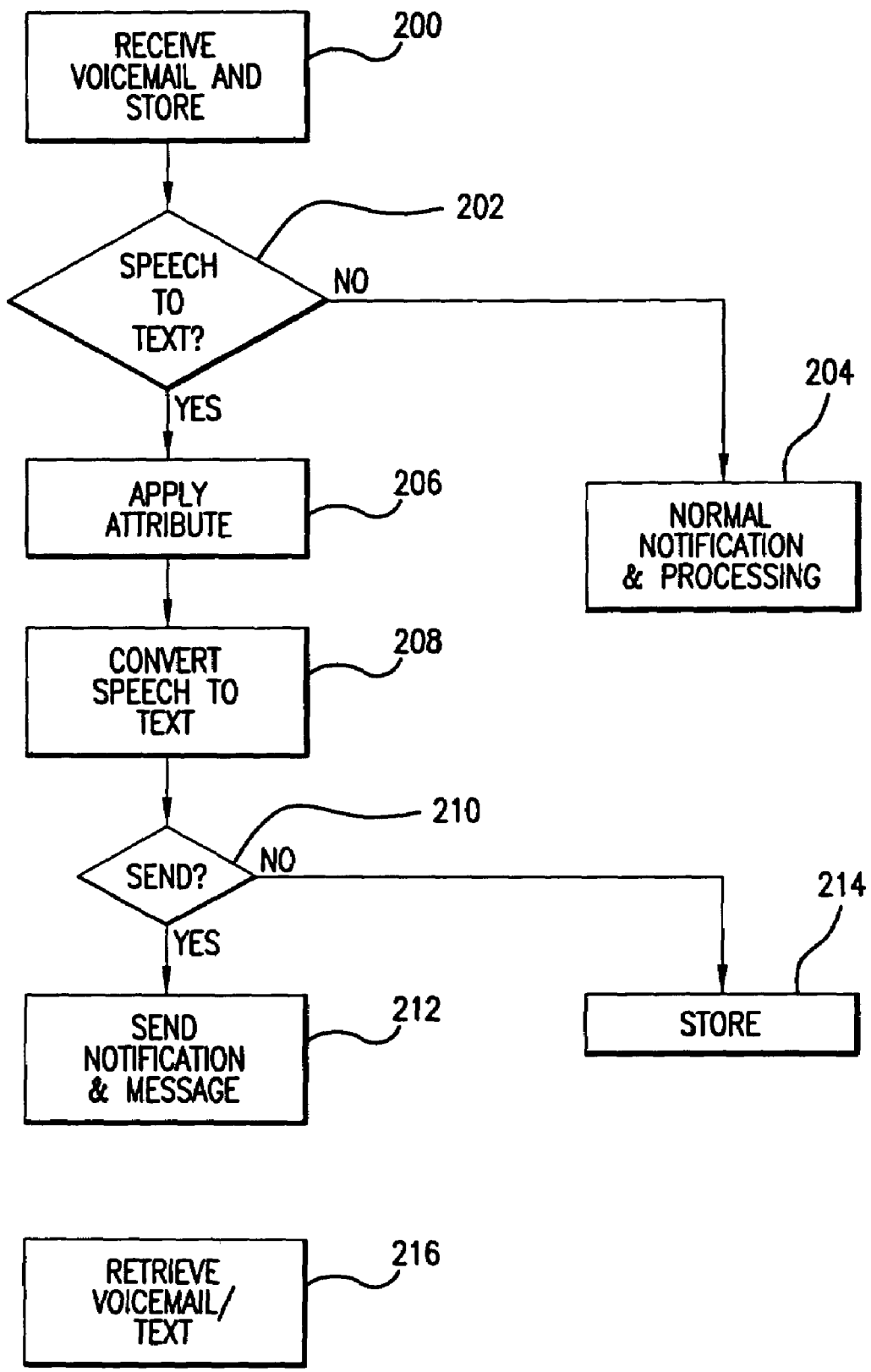
FIG. 2 is a flow chart illustrating a method for providing speech-to-text conversion in a multimedia telecommunications system in accordance with the present invention.

FIG. 2 is a flow chart illustrating a preferred method for implementing speech-to-text and text-to-speech conversion in accordance with the present invention. FIG. 2 is described below with reference to the preferred embodiment shown in FIG. 1. In the preferred method shown in FIG. 2, user devices 102 initiate calls or communications over multimedia communications system 100.

In the typical scenario, a call or communication is initiated by a user device 102. FIG. 2 is illustrative of a call being placed by a user device 102 to another user device 102 that does not answer the call. In a manner well known in the art, the user device making the call, i.e., the calling device, is connected to, or otherwise placed in communication with, voicemail system 112. Typically this is based on a profile, stored attribute or database associated with the user device that is being called, i.e., the called device. The calling device is prompted by the voicemail system 112 to leave a voice message for the called device. The voice message is received and stored by the voicemail system (200). Preferably, the voice message is stored as digital data in voicemail server 114. Those of skill in the art will readily recognize that the voice message may already be in a digital format, for example where a packet network device is coupled to voicemail system 112. On the other hand, voicemail system 112 may need to reformat the digital data or convert voice in the voice message to a digital format for storage.

After the digital voice message is stored (200), voicemail system 112, preferably determines whether the voice message should be converted from speech-to-text (202). Most preferably, this determination is made by checking a profile or database associated with the called device. The called device profile or database may be as simple as a single entry indicating whether voice messages should be converted to text. Or, the profile may be more sophisticated, including determining whether the voice message is converted to speech on the basis of time, location of the called device, attributes of the calling device or its location, or any other parameter.

If speech-to-text processing is not desired (202), then the voice message is processed in the normal manner, making it available for retrieval, forwarding, deletion, saving, and the like, in accord with known voice mail processing (204). On the other hand, if speech-to-text processing is desired, as determined by the profile, for example, then an attribute is applied to or associated with the message to indicate it should be converted from speech-to-text. In the preferred embodiment, voicemail server 114, determines whether a voice message should be converted from speech to text and identifies the message accordingly.

Once a voice message is appropriately marked to indicate speech-to-text processing is desired (206), the voice message is preferably sent to application server 116 over a data link 118 for the appropriate processing. Application server 116 converts the speech to text using any known algorithm (208). For example, a speaker independent algorithm is applied to convert speech to text. Alternatively, where there is historical information for a particular calling device, a speaker dependent algorithm is applied. In yet another alternative, a profile associated with the calling device includes speech data associated with the user that is forwarded with the voice message to the application server 116 for use in converting the voice message into text. If the speech data for the user is not forwarded with the voice message, application server 116 may obtain the speech data from the network or a user device associated with or coupled to the network. As an alternative to storing the voice message prior to conversion to text, real-time speech to text processing in voicemail system 112 may be employed.

After the speech is converted to text (208), a determination is made as whether to, and where to, send the text message (210). This determination is preferably made based on the user profile, and may be as simple as a flag indicating whether to send or not. Or the determination may be based on other factors, such as location of the calling device, location of the called device, time, predetermined variables set by a user, or any other criteria.

If the text message is to be sent, then an appropriate method for sending is selected. The text message is sent for example by email, facsimile transmission, short message service, posting on a Web page, or by any other electronic means (212). Separate and apart from the actual text message, a message notification may be sent, for example, a message to alert a user device that a text message is available. If no message is to be sent (210), then the message is stored for later retrieval (214). Preferably, the speech associated with the message is retained and associated with the text message for possible further processing.

After the voice or text message(s) is stored, it may be retrieved (216). The message(s) is retrieved in a manner analogous to traditional voice mails. Typically, retrieval is initiated by the called party or another party initiating a call or otherwise connecting to the voicemail system 112, for example, by connecting to a Web page. Then through a user interface, such as touch tones, voice commands, keyboard and display, or the like, the message is retrieved. Through the user interface, the text message may be displayed or the voice message may be made audible. Other options that are preferably available through the user interface include deleting the voice or text message, saving the voice or text message locally or in the network, and forwarding the voice or text message. Most preferably, additional options include converting a text message to a voice message and forwarding or storing it. In lieu of actual conversion, a stored version of an original voice message that was converted to text may be forwarded or stored. For example, a message stored at application server 116 may be forwarded. Conversely, a voice message is optionally converted to a text message using application server 116 at the user's option using steps 202, 206 and 208. And, then the text message is forwarded or stored, either locally or in the network, for example, in voicemail system 112. An additional option in reviewing the text or voice message is to respond or reply, either via a text message or a voice message. The reply message is entered as text or voice, with the option to use speech-to-text or text-to-speech conversion to change the form of the message.

Figure 3A:
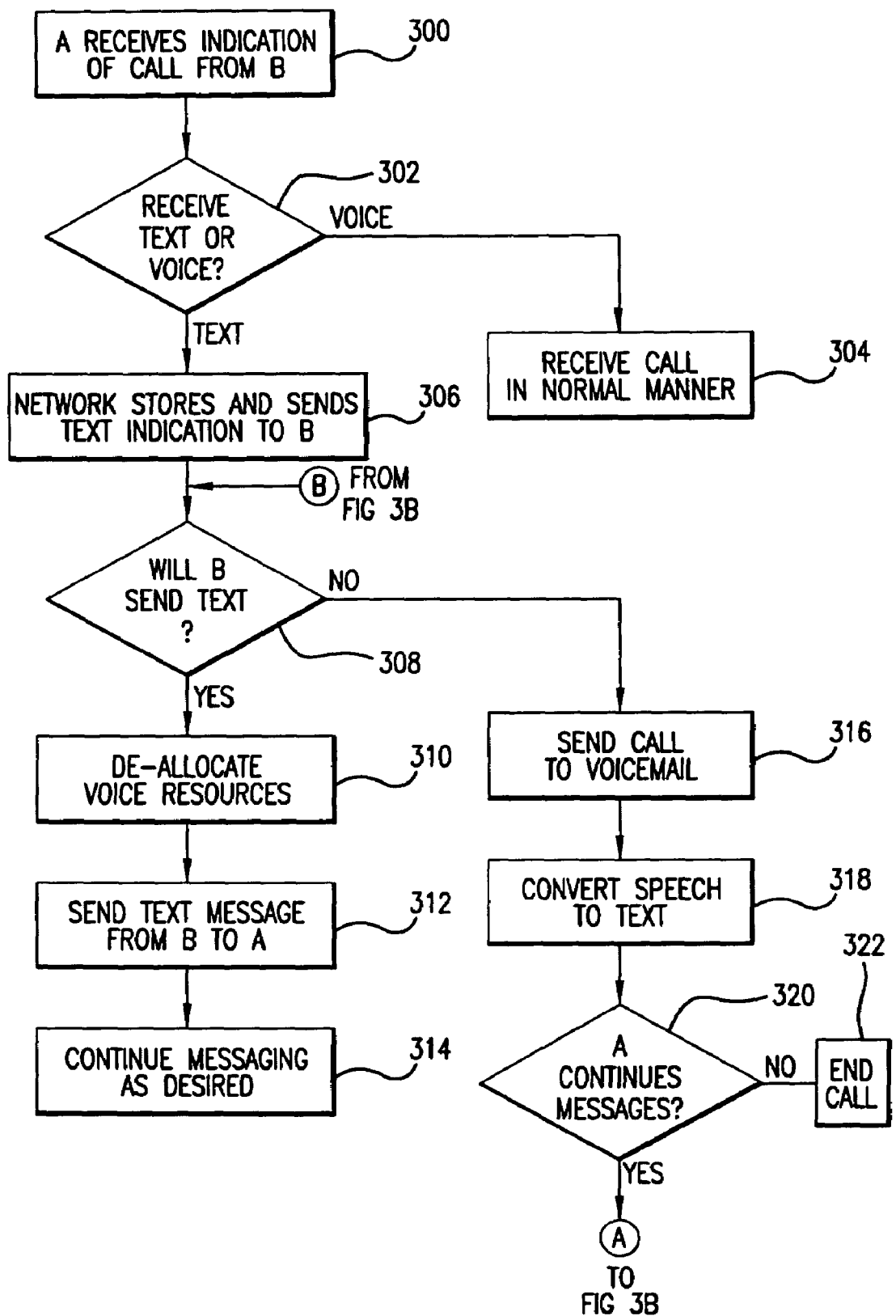
FIG. 3A–B are a flow chart illustrating a method for accommodating text and voice communication in accordance with the present invention.
Figure 3B:
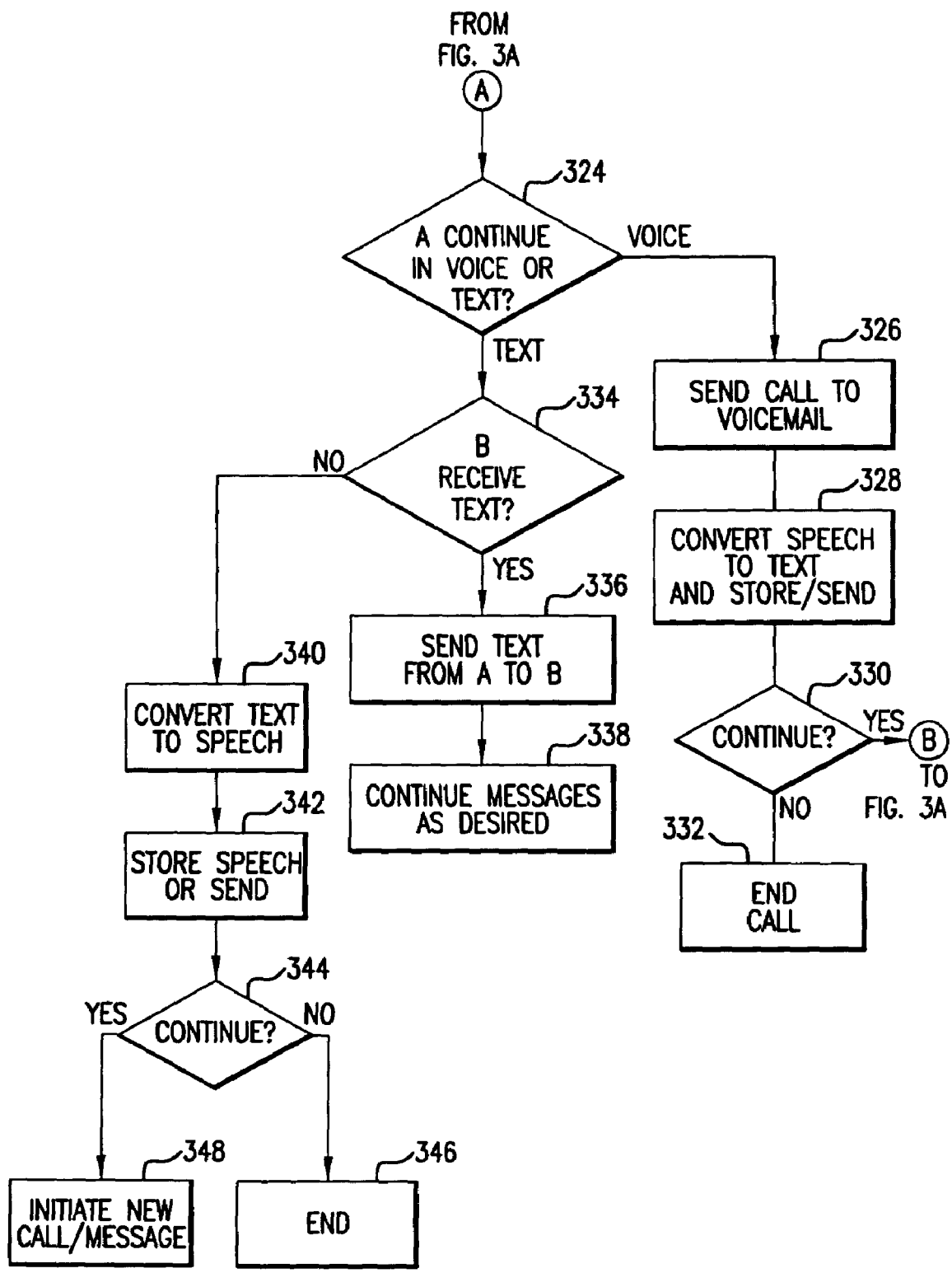

FIG. 3A–B are a flowchart illustrating a preferred method in accordance with an additional aspect of the present intention. More specifically, FIG. 3A–B are a flowchart illustrating an interaction between two user devices 102, which engage, optionally, in voice and text communication in accordance with the present intention.

First, user device B initiates a call to user device A, and user device A receives an indication of the incoming call from user device B. (300). For purposes of illustrating the particular usefulness of the preferred method, it is assumed that the user of user device A is engaged in a meeting. In accordance with the present intention, user device A provides its user an option to receive a text message or receive a voice message for the incoming call (302). This option is conveyed to the user in any known manner, including displaying the option on a display included with user device 102. The user selects the desired option using any input device associated with user device 102. In the exemplary case, where the user of user device A is in a meeting and can not engage in a voice conversation comfortably, the user may elect to receive text. On the other hand, if the user of user device A is in a position to engage in a voice conversation with user device B, then the call is received in the normal manner and the conversation proceeds (304).

Where the user selects the option to receive text, the option is communicated by user device 102 to network access device 104 and to any applicable devices and applications associated with network 106. And, the selection to receive text is preferably indicated to user device B and a network access device 104 associated with user device B. (306).

After the applicable network devices and user device B have an indication that a text message is desired (306), a determination is made as to whether user device B will send a text message (308). In particular, since user device B may take many forms, including some forms that may not have the capability to send text, it is desirable to determine whether or not user device B in fact will send text. Most preferably, user device B receives an indication that a text message is requested and provides the user of user device B an opportunity to agree to send text directly or not. In accordance with the present intention, the ability to send text directly from user device B is not required, since a speech-to-text function is advantageously provided in the network. Where a profile or other stored information is available in the network regarding the capabilities of user device B, the network may determine whether user device B will send text, for example, by determining that no text capability is provided on user device B. In the case where device B will respond with a text message directly, voice resources allocated and associated with the initial voice call (300), are de-allocated and messaging resources are allocated (310). Subsequently, the text message is sent from user device B to user device A (312). The text message is entered and sent using any known and available method, including entering the text using a keyboard and sending user device B the message via a short message service (SMS) or via email. The destination for the message is preferably determined based on the destination for the original call (300). Alternatively, the network may store a text message destination address associated with a profile for user device A, the called device. After the text messages is sent from user device B to user device A (312), messaging may continue as desired between user device A and user device B in any known manner, such as responsive emails. Notably, only messaging resources are required for further text messaging between user device A and user device B, and voice resources can be released or reallocated.

If it is determined that user device B will not send a text message directly (308), then user device B is permitted to respond in voice for speech that is subsequently converted to text. To complete this process, in the preferred embodiment, user device B is coupled to voicemail system 112 (316). Voicemail system 112 then converts the voice delivered from user device B into a text message for storage (318). And, if appropriate, preferably as determined by a user profile, a notification is sent alerting user device A of the availability of the text message. Most preferably, a user profile determines that the text message is sent to user device A via an e-mail, a SMS message, a facsimile or the like. Upon receipt of the text message, user device A determines whether continued messaging with user device B is desired (320). If no further messaging is desired, the communication or call is ended (322). On the other hand, if continued messaging is desired, for example, in the case where the user of user device A is in a meeting and can not continue with voice communication, but desires to continue text messaging to facilitate communication, user device A continues with a voice or text response (324).

Where user device A continues with voice that will subsequently be converted to text for user device B. (324), user device A is coupled to voicemail system 112 for conversion of speech on that call to a text message (326). The speech is converted to text and stored (328). And, according to a user profile, the text message is sent and/or a notification of the availability of the text message is sent (328). If the communication between the devices is to end (330), then the call is terminated (332). If further communication is desired at this point (330), then user device B optionally determines whether the response will be in text or voice and continues use as shown in step 308.

If at step 324 user device A decides to continue in text (324), then a determination is made as to whether device B will receive text (334). This determination is optionally made according to a user profile or an option entered at user device B. If user device B will receive text (334), then text is sent directly from user device A to user device B (336), and messaging is continued as desired using a selected text messaging format (338). If, on the other hand, user device B will not receive text directly (334), then text from user device A is sent to voicemail system 112 for conversion to speech (340). After the text is converted to speech (340), the speech is stored and sent to user device B (342). If the conversation is not going to continue (344), then communication is terminated (346). If continued communication is desired (344), then, typically, a new voice call or messaging session is generated (348). More specifically, steps 300 or 312 are repeated and the flow can continue, depending upon whether a voice call or text message is used for further communication.

Whereas the present invention has been described with respect to specific embodiments thereof, it will be understood that various changes and modifications will be suggested to one skilled in the art and it is intended that the invention encompass such changes and modifications as fall within the scope of the appended claims.

The invention claimed is:

1. A method for receiving text messages in a telecommunications network, the method comprising the steps of:
   receiving an incoming call from a calling user device coupled to the telecommunications network to a called user device coupled to the telecommunications network;
   sending an indication of the incoming call to the called user device, including an option to receive voice or text;
   receiving a response from the called user device indicating that text is desired;
   sending to the calling user device an indication that text is desired;
   determining whether the calling user device will respond with text or voice;
   in response to an indication that the calling user device will send text, receiving a first text message from the calling user device; and
   sending the first text message to the called user device.

2. The method of claim 1 wherein the step of determining whether the calling user device will respond with voice or text includes checking a user device profile of the calling user device.

3. The method of claim 1 wherein the step of determining whether the calling user will respond with voice or text includes receiving a response from the calling user device indicating whether the calling user device will respond in voice or text.

4. The method of claim 1 wherein the first text message is sent over a packet-based network.

5. The method of claim 1 wherein in response to an indication that the calling user device will send voice, receiving a voice message from the calling device and converting the voice message into the first text message.

* * * * *